(12) United States Patent
Snowsill

(10) Patent No.: US 7,726,940 B2
(45) Date of Patent: Jun. 1, 2010

(54) SEAL ARRANGEMENT AND A METHOD OF SEAL ASSEMBLY

(75) Inventor: Guy David Snowsill, Derby (GB)

(73) Assignee: Rolls-Royce PLC, London (GB)

( * ) Notice: Subject to any disclaimer, the term of this patent is extended or adjusted under 35 U.S.C. 154(b) by 721 days.

(21) Appl. No.: 11/498,715

(22) Filed: Aug. 4, 2006

(65) Prior Publication Data

US 2007/0052179 A1    Mar. 8, 2007

(30) Foreign Application Priority Data

Sep. 2, 2005    (GB)    ................................. 0517833.0

(51) Int. Cl.
*F01D 11/00* (2006.01)

(52) U.S. Cl. .................... 415/231; 415/174.2; 277/413; 277/415; 277/416; 277/421; 277/543; 277/924; 29/424; 29/447; 29/523

(58) Field of Classification Search ................. 415/231, 415/170.1, 173.1, 173.3, 173.4, 174.2, 174.4, 415/229–230, 111, 113; 277/543, 413, 415, 277/416, 421, 305, 924; 29/423, 424, 447, 29/522.1, 523
See application file for complete search history.

(56) References Cited

U.S. PATENT DOCUMENTS

| 1,309,075 | A | * | 7/1919 | Morris | 277/543 |
|---|---|---|---|---|---|
| 3,001,806 | A | * | 9/1961 | Macks | 277/305 |
| 4,082,296 | A | * | 4/1978 | Stein | 277/400 |
| 4,365,817 | A | * | 12/1982 | Davis | 277/543 |
| 5,509,664 | A | * | 4/1996 | Borkiewicz | 277/543 |
| 5,779,244 | A | * | 7/1998 | Moriarty et al. | 277/311 |
| 6,254,344 | B1 | * | 7/2001 | Wright et al. | 415/231 |
| 6,431,550 | B1 | * | 8/2002 | Tong | 277/346 |
| 6,572,113 | B2 | * | 6/2003 | Care | 277/410 |
| 6,644,667 | B2 | * | 11/2003 | Grondahl | 277/355 |

FOREIGN PATENT DOCUMENTS

| GB | 2 096 246 A | 10/1982 |
|---|---|---|
| GB | 2 368 100 A | 4/2002 |

* cited by examiner

*Primary Examiner*—Christopher Verdier
(74) *Attorney, Agent, or Firm*—Oliff & Berridge, PLC

(57) ABSTRACT

Assembly of segmented seals can be problematic in areas of limited space for an introductory tapered mandrel and where there are the problems with damage to the seal surfaces 23, 24. By the present method and arrangement, a seal formed from segments 22 is expanded to an expanded state and then retained at that state by the use of a sacrificial material 26 in the gaps 25 between the segments 22 opened by expansion. The sacrificial material 26 is typically a low melting temperature wax and so is removed when the seal arrangement reaches its operating temperature.

12 Claims, 2 Drawing Sheets

SEAL ARRANGEMENT AND A METHOD OF SEAL ASSEMBLY

The present invention relates to seals and more particularly assembly of seals to avoid damage during installation.

Seals are used in a wide variety of situations where a divide must be provided between respective sides of a machine or between compartments or stages. Thus, it is known to provide a seal about a rotating shaft to retain lubricant or simply separate one side from the other.

One form of seal comprises a number of seal segments which are assembled and associated about a shaft to form a seal together. The segments are generally secured in a housing and utilise a circumferential spring to create inward sealing force and pressure. Typically, previous practice was to use a tapered mandrel to lead to a static seal element on to a seal runner or other seal surface. Prior art FIG. 1 attached schematically illustrates such a seal assembly arrangement 1 as a side cross-section. In the arrangement 1 there is a seal segment 2 in a housing 3 which itself is secured in a wall portion 4. As indicated above the seal segment 2 is slightly displaceable in a radial outward direction indicated by arrowhead 5 against a bias circumferential spring. In such circumstances, a tapered mandrel 6 can ease the seal segment outwardly in the direction 5 when the arrangement is assembled by relative movement in a direction of assembly shown by arrowhead 7. The outward movement means that a sealing surface 9 of the segment 2 can engage a seal runner 10 in use to form a seal. It will be understood that generally there will be a number of segments all moved outwardly to a diameter to allow entry of the runner 10 and subsequent withdrawal of the mandrel 6.

It will be understood in some situations it may not be practical to use a tapered mandrel. Thus, in such circumstances it is the practice to arrange the axial locations of the seal and bearing components so that the shaft bearings engage before the seal elements. Such an arrangement ensures that the mis-alignment of the seal element is limited to the working clearances in the bearings and their location.

In addition to the problems of assembly as outlined above it will be understood that there is no protection against damage for the seal elements as a result of the engagement with the seal runner. This limits design choices for the seal runner in order to limit the prospects of damage. It will be understood that in many situations it may not be possible to use a sympathetic long tapered mandrel due to space constraints during assembly. Thus the seal surface may be damaged on assembly leading to potential failure of the seal arrangement.

In accordance with the present invention there is provided a method of assembly of a seal arrangement, the method comprising presenting a mandrel to a seal arrangement to radially expand a seal to an expanded state by opening gaps in the seal to a diameter sufficient to accommodate a seal surface against which the seal acts in use, the method characterised in that the gaps are packed with a sacrificial material to retain the expanded state whilst the seal is associated with the seal after the mandrel is removed.

Generally, the arrangement is heated to remove the sacrificial material when the sacrificial material is a low temperature wax. Typically, the heating is provided by normal in use operational temperatures for the seal arrangement.

Possibly, the arrangement is washed in a solvent to remove the sacrificial material when the sacrificial material is soluble.

Also in accordance with the present invention there is provided a seal arrangement for a shaft, the arrangement comprising a seal for dilation. The seal may be radially expandable by opening of gaps in the seal for assembly of the seal arrangement, the arrangement characterised in that the gaps are filled with a sacrificial material to retain expansion of the seal for the assembly of the seal and the sacrificial material is removable once assembled.

Typically, the seal comprises a plurality of seal segments with gaps between them. Generally, the seal segments are associated with bias for inward sealing pressure in use against a sealing surface. Normally, the bias is provided by a circumferential spring.

Typically the seal is dilated by expansion. Normally, the seal is expanded to allow assembly to a seal surface.

Normally, the seal surface is a seal runner.

Typically, the sacrificial material is a low melting temperature wax. Alternatively, the sacrificial material is soluble in a wash solvent.

Embodiments of the present invention will now be described by way of example only with reference to the accompanying drawings in which:—

Generally, a seal arrangement comprises a number of seal segments. The static component part of the seal arrangement thus has a number of seal segments. Each segment is associated with other segments to form a circle which in use will substantially extend around a shaft. The seal segments are held in a housing which provides axial location and some radial restraint to define the limits of seal travel. In use, the seal segments are forced inwards by a circumferential spring so that here is sealing pressure created against a sealing surface of a rotating element or seal runner.

Figure 2:
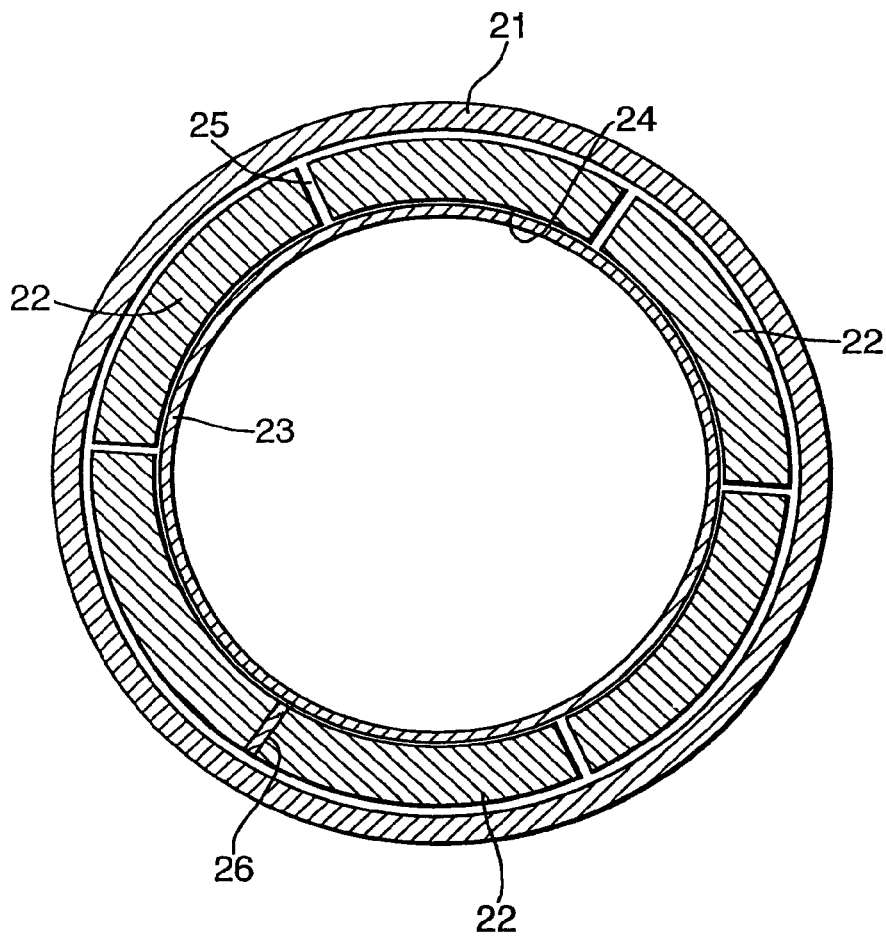
FIG. 2 is a schematic front view of a seal arrangement including a seal and a rotating element such as a shaft.
Figure 3:
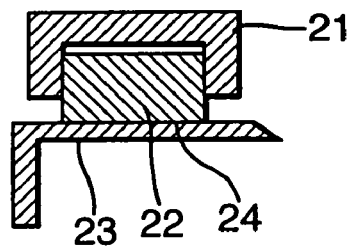
FIG. 3 is a schematic cross-section through a part of the arrangement shown in FIG. 2; and, FIG. 4 is a schematic front view of the seal arrangement shown in FIG. 2 and FIG. 3 in use and in a dis-assembled state.

FIGS. 2 and 3 schematically depict a seal arrangement about a rotating element such as a shaft in an engine or other machine. Thus, a housing 21 supports, secures and presents a plurality of seal segments 22 to a seal surface 23 in this case in the form of a seal runner. As indicated above normally there is an inward bias provided by a circumferential spring or similar so that there is a sealing pressure between a seal surface 24 of the segments 22 and an opposed part of the seal surface 23.

It will be understood that damage to the seal arrangement upon assemble particularly with respect to the seal surface 24 will be detrimental to overall seal efficiency. Such damage may occur through inappropriate use of a tapered mandrel and premature contact between the segments 22 and other parts of the seal arrangement such as features of a seal runner. Ideally, it should be possible to assemble the seal segments on the seal surface, whether a rotating shaft or a seal runner, with a reduced possibility of damage and if possible without use of a mandrel in situ in view of normal space problems.

In the present seal arrangement seal segments 22 are assembled into their housing 21 with a bias spring away from the location where the arrangement will be used. Thus, it will be generally be more convenient to use a tapered mandrel to expand the seal so that gaps open between the segments 22 and the open diameter of the seal increases and dilates to a size sufficient to allow easy association with seal a surface during later stages of the method of assembly.

With the present arrangements the expanded state of the seal arrangement is retained by a sacrificial material filling to the gaps 25 between the segments 22. Thus, when the mandrel is removed the expanded state is maintained to allow entry and other association of the seal about a seal surface 23.

Clearly, the purpose of a seal arrangement is to provide a sealing pressure against the sealing surface 24. This will not occur if the effect of a pressure bias spring is inhibited by the filling of sacrificial material in the gaps 25. Thus, in the present seal arrangement the sacrificial material is readily removed.

In a preferred embodiment the sacrificial material is a low melting point wax or similar material. Thus, as the sealing arrangement temperature warms in normal operational use the wax will melt and flow out of the gaps 25 leaving the segments free to be biased inwardly towards the seal surface to create a seal. In such circumstances, it is important to use a suitable wax so that the wax melts in the right temperature range and without too much fractionation with higher melting point waxes remaining in the gaps 25 or elsewhere in the arrangement. It will be understood that the melted wax will be carried away by the fluid being controlled by the seal arrangement. The wax may be soluble in the controlled fluid or not so that any solidified globules of wax can be removed by an appropriate filter.

An alternative for the sacrificial material is that it may be soluble in a specific solvent introduced for the purpose or the fluid controlled by the seal arrangement. Thus, the sacrificial material may be removed by dissolving it in the solvent or fluid.

Figure 1:
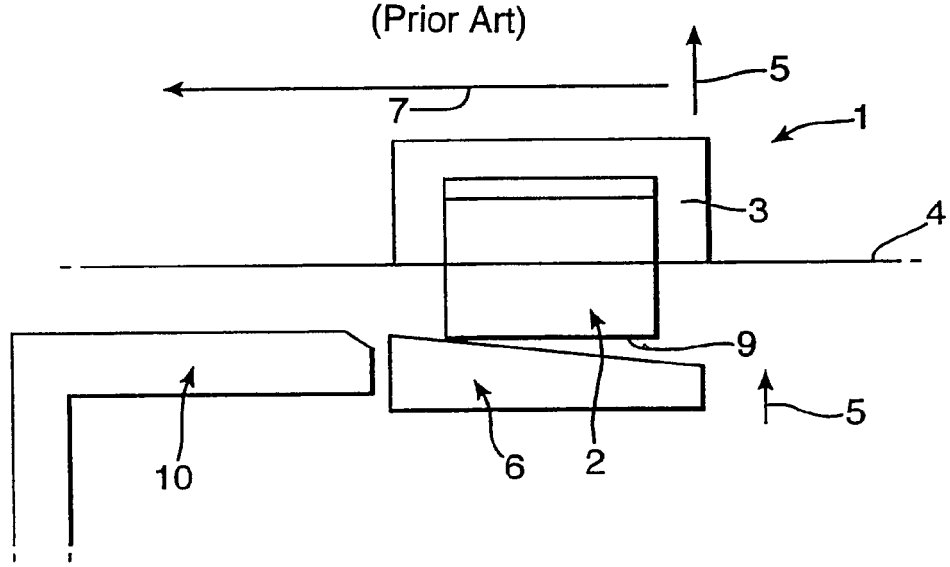
FIG. 1 is a schematic view of the related art.

An example sacrificial material in-fill 26 is shown in FIG. 1 in one of the gaps 25. Thus, as can be seen the seal is expanded to the expanded stage of a greater diameter than the seal surface 23 or runner minimising the risk of contact between the seal surface 23 and the seal 22 during assembly.

Figure 4:
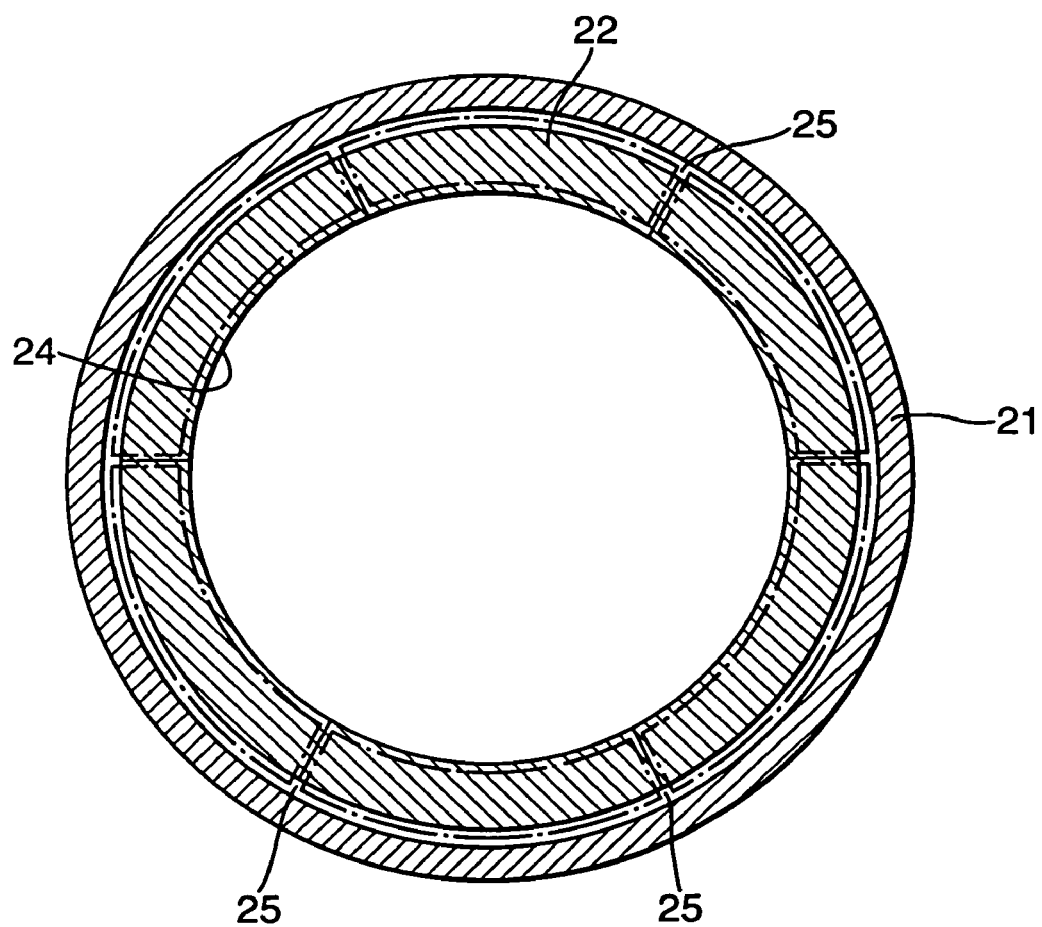

In FIG. 4 as can be seen the seal surface 24 is provided by a seal runner and this is engaged by the seal surface 24 of the seal segment 22. The housing 21 provides for axial restraint of the segment 22 and allows only limited radial displacement into and out of the housing 21. The radial displacement as indicated is generally controlled by a biasing spring or other mechanism in order to ensure there is good sealing pressure between the surface 24 and the surface 23.

FIG. 4 provides a schematic illustration of the seal comprising segments 22 in an assembled and dis-assembled state. The sealing surface provided by the rotating element or seal runner is removed for clarity.

In a dis-assembled state the segments 22 reach their limit of inward movement when they reach a stop or more normally when ends of the segments 22 abut against each other. This abutment between the segments 22 is shown in FIG. 3 by the solid lines. In this dis-assembled state the ends of the segments 22 touch and a continuous circular surface is formed. This circular surface is of a diameter smaller than that of the rotating shaft or seal runner. Thus, with the spring bias there will be a sealing pressure generated.

Correct seal segment position is shown by the broken lines. It will be noted that the segments drop to a significantly smaller diameter to generate with the bias spring sufficient seal pressure for the arrangement.

It will be understood that the sacrificial material will generally be malleable and so when the mandrel is removed there may be some squeezing of the sacrificial material but the expanded stage will be substantially retained. The squeezing effect may be used to expedite remove of the sacrificial material once assembly is complete.

After the sacrificial material is removed the seal assembly will act like a typical segmented seal arrangement with the seal segments engaging the seal surface with a seal pressure generated by a circumfunctional spray or similar mechanism.

Modifications and adaptations of the present seal arrangement will be appreciated by those skilled in the technology. Thus, the sacrificial material may comprise a single wax or a number of waxes or be reinforced with micro-encapsulated solvents/agents or other means to expedite removal of the sacrificial material. These solvents and agents may act to keep the sacrificial material in solution or to prevent retention of a detrimental retained surface film of sacrificial material which may undermine seal efficiency. The segments may include effective guttering channels to guide removal of the molten or exuding sacrificial material and possibly prevention/inhibit sacrificial material becoming deposited on the sealing surfaces.

I claim:

1. A method of assembly of a seal arrangement, the arrangement comprising a seal having a plurality of seal segments, gaps being formed between the seal segments, and an inward bias for inward sealing pressure disposed against a first seal surface, the method comprising presenting a mandrel to the seal arrangement to radially expand the seal to an expanded state by opening the gaps in the seal to a diameter sufficient to accommodate a second seal surface disposed against the seal, wherein the gaps are packed with a sacrificial material to maintain the expanded state while the seal is associated with the second seal surface after the mandrel is removed.

2. The method of claim 1, further comprising heating the seal arrangement to remove the sacrificial material when the sacrificial material is a low temperature wax.

3. The method of claim 2, wherein heating is provided by in-use operational temperatures of the seal arrangement.

4. The method of claim 1, further comprising washing the arrangement in a solvent to remove the sacrificial material when the sacrificial material is soluble.

5. A seal arrangement for a shaft, the arrangement comprising a seal having a plurality of seal segments, gaps being formed between the seal segments, and an inward bias for inward sealing pressure disposed against a first seal surface, wherein the gaps are filled with a sacrificial material to maintain expansion of the seal for assembly of the seal and the sacrificial material, wherein the sacrificial material is removable, without eliminating the inward bias, after the assembly.

6. The arrangement of claim 5, wherein the inward bias is provided by a circumferential spring.

7. The arrangement of claim 5, wherein the seal is expanded to allow assembly with the first seal surface.

8. The arrangement of claim 5, wherein the first seal surface is a seal runner.

9. The arrangement of claim 5, wherein the sacrificial material is a low melting temperature wax.

10. The arrangement of claim 5, wherein the sacrificial material is soluble in a wash solvent.

11. A machine incorporating the seal arrangement of claim 5.

12. The machine of claim 11, wherein the machine is a gas turbine engine.

* * * * *